US012797780B2

(12) United States Patent
Lingen et al.

(10) Patent No.: US 12,797,780 B2
(45) Date of Patent: Nov. 17, 2026

(54) FILTER DEVICE

(71) Applicant: HYDAC Process Technology GmbH, Neunkirchen (DE)

(72) Inventors: Hans-Jürgen Lingen, Mönchengladbach (DE); Sebastian Hrin, Elsdorf (DE); Raphael Klein, Netphen (DE)

(73) Assignee: HYDAC PROCESS TECHNOLOGY GMBH, Neunkirchen (DE)

( * ) Notice: Subject to any disclaimer, the term of this patent is extended or adjusted under 35 U.S.C. 154(b) by 385 days.

(21) Appl. No.: 18/686,192

(22) PCT Filed: Jun. 7, 2022

(86) PCT No.: PCT/EP2022/065381
§ 371 (c)(1),
(2) Date: Feb. 23, 2024

(87) PCT Pub. No.: WO2023/025425
PCT Pub. Date: Mar. 2, 2023

(65) Prior Publication Data

US 2024/0382875 A1 Nov. 21, 2024

(30) Foreign Application Priority Data

Aug. 24, 2021 (DE) ..................... 10 2021 004 351.0

(51) Int. Cl.
*B01D 29/68* (2006.01)
*B01D 29/23* (2006.01)
*B01D 29/94* (2006.01)

(52) U.S. Cl.
CPC ......... *B01D 29/682* (2013.01); *B01D 29/232* (2013.01); *B01D 29/688* (2013.01);
(Continued)

(58) Field of Classification Search
CPC .. B01D 29/682; B01D 29/232; B01D 29/688; B01D 29/945; B01D 2201/082; B01D 2201/084; B01D 2201/12
(Continued)

(56) References Cited

U.S. PATENT DOCUMENTS

2017/0128860 A1 5/2017 Cartarius ............. B01D 29/682

FOREIGN PATENT DOCUMENTS

CA 2278433 C * 12/2009 ............. B01D 29/23
DE 36 11 075 10/1987 ............. B01D 35/22
(Continued)

OTHER PUBLICATIONS

Machine-generated English translation of DE 4208743, generated on May 7, 2026.*
(Continued)

*Primary Examiner* — Fred Prince
(74) *Attorney, Agent, or Firm* — Slayden Grubert Beard PLLC

(57) ABSTRACT

Filter apparatus, consisting of at least—a filter (14), which is divided into individual filter segments, —a cleaning device (19), which has, associated with each filter segment, a partial cleaning unit (20, 21, 22), which can be moved along the cleaning device and which cooperates with a removal device (23), and —a control device (40), which activates at least one partial cleaning unit for cleaning, whereas at least one further partial cleaning unit remains inactive during this cleaning, wherein the control device (40) has a coupling device, which in one position of the coupling device, connects the cleaning device (19) to the discharge device (23) for a common rotary movement and, in another position of the coupling device, separates them from one another.

20 Claims, 7 Drawing Sheets

(52) U.S. Cl.
CPC ...... *B01D 29/945* (2013.01); *B01D 2201/082* (2013.01); *B01D 2201/084* (2013.01); *B01D 2201/12* (2013.01)

(58) Field of Classification Search
USPC .................................................. 210/411, 408
See application file for complete search history.

(56) References Cited

FOREIGN PATENT DOCUMENTS

| | | | | |
|---|---|---|---|---|
| DE | 4208743 C2 * | 9/1995 | ........... | B01D 29/682 |
| DE | 20 2014 104200 | 9/2015 | ............. | B01D 29/68 |
| DE | 20 2016 003089 | 6/2016 | ............. | B01D 29/66 |
| DE | 102017001968 A1 * | 4/2018 | ............. | B01D 29/58 |

OTHER PUBLICATIONS

Machine-generated English translation of DE 102017001968, generated on May 9, 2026.*
Search Report for International Application No. PCT/EP2022/065381, 4 pages, Aug. 30, 2022.

* cited by examiner

FILTER DEVICE

CROSS-REFERENCE TO RELATED APPLICATIONS

This application claims priority to German Patent Application No. DE 10 2021 004 351.0, filed on Aug. 24, 2021 with the German Patent and Trademark Office. The contents of the aforesaid Patent Application are incorporated herein for all purposes.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

The disclosure relates to a filter device, consisting of at least one filter, which is divided into individual filter segments, a cleaning device, which has, associated with each filter segment, a partial cleaning unit, which can be moved along the cleaning device and which cooperates with a rotatable discharge device with individual discharge openings which, brought into at least partial alignment with passage points in the cleaning device, serves to discharge a fluid flow from the filter, and a control device, which activates at least one partial cleaning unit for cleaning, whereas at least one further partial cleaning unit remains inactive during this cleaning.

DE 42 08 743 C2 discloses an automatic backflushing filter for liquids, consisting of a filter housing with an inlet and a filtrate outlet as well as a sludge discharge, in which at least one or more multi-chamber nozzles, arranged coaxially one above the other on a hollow drive shaft as a cleaning device, rotate as partial cleaning units in a cylindrical filter cartridge which serves as a filter and is functionally divided into individual filter segments with regard to backflushing. The known solution also has a control tube serving as a discharge device, which control tube forcibly rotates at different speeds to the multi-chamber nozzle, whereby as a result of this its individual chambers are controlled slowly in such a manner that a multi-chamber nozzle previously serving as a passive chamber is activated and at the same time the previous active chamber is closed, whereby the backflushing process is cyclically continued until all chambers have been activated.

Due to the fact that the control tube rotates continuously in the same direction and coaxially with the multi-chamber nozzles in the cleaning device, both are mounted coaxially together in the filter cartridge, and the drive for the cleaning device and the discharge device is a common one, the backflush volume flow, the absolute pressure drop and the pressure drop per unit time are reduced in such a manner that the backflushing processes can substantially be carried out with high intensity.

The known solution requires an independent rotary drive for both the cleaning device and for the discharge device, each with an independent gear stage which, however, can be jointly operated by a single rotary drive which, on the one hand, requires a corresponding installation space and, due to the gear drive to be controlled, a great deal of drive energy is regularly required by the rotary drive in the form of an electric motor.

SUMMARY

A need exists to improve a filter device to the effect that a space-saving configuration with energy-efficient drive and improved cleaning is provided.

The need is addressed by the subject matter of the independent claim(s). Embodiments of the invention are described in the dependent claims, the following description, and the drawings.

DESCRIPTION

Figure 1:
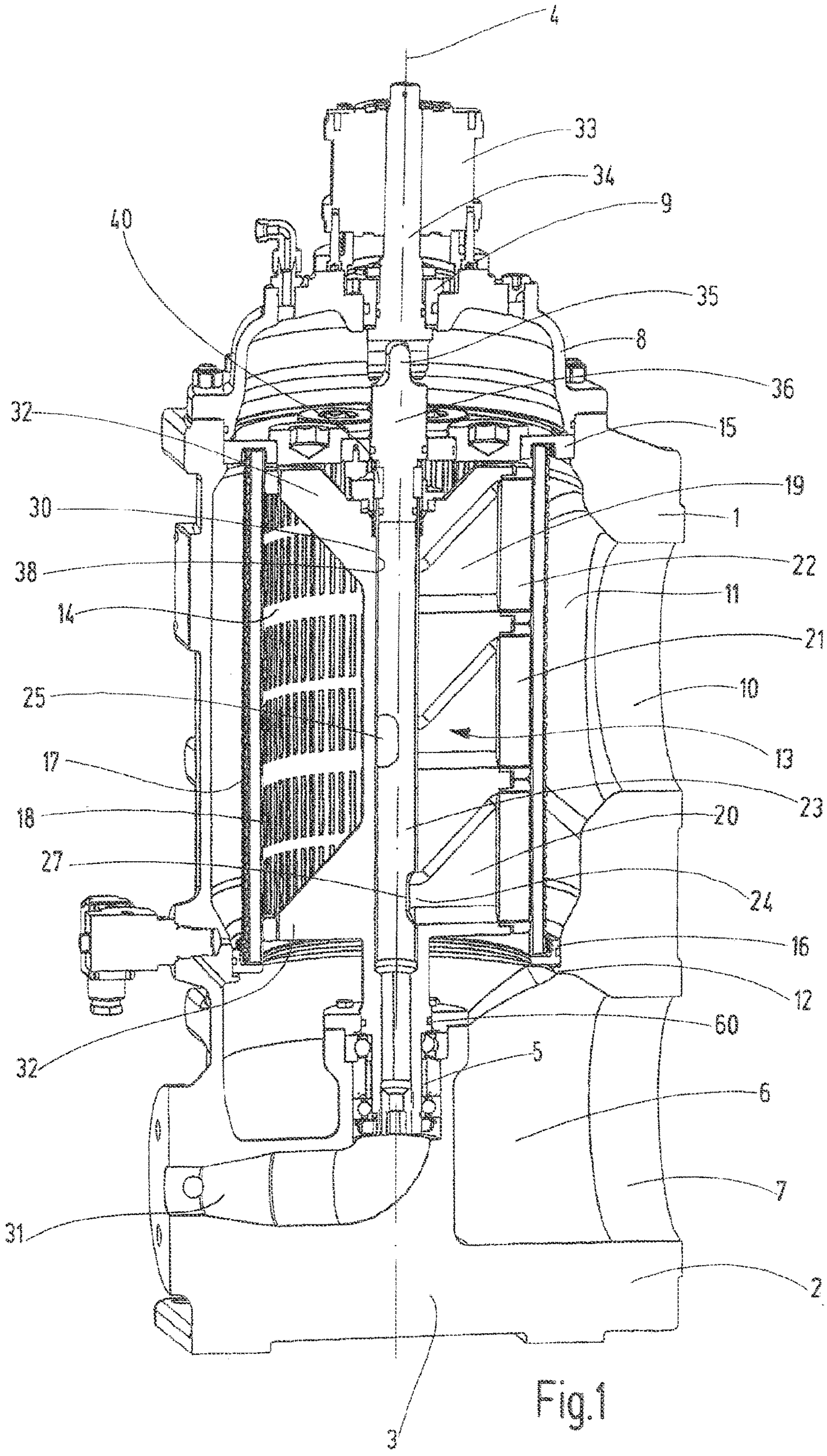
FIGS. 1 to 3 show a central longitudinal section through an example filter device in various actuation positions, FIGS. 2 and 3 only reproducing the filter device according to FIG. 1 in part.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In some embodiments, the control device has a coupling device, which, in one position of the coupling device, connects the cleaning device to the discharge device for a common rotary movement and, in another position of the coupling device, disconnects them from each other. The solution according to the teachings herein does not require any transmission gears which enables a space-saving configuration. Contributing to this is the fact that the coupling device referred to is accommodated in a space-saving manner in a coaxial arrangement with the respective tubular cleaning device and discharge device, which discharge device is guided rotatably in the cleaning device and engages with both of these in the interior of the filter, which in this respect is configured in the manner of a basket. Furthermore, the coupling device allows timely control of both the cleaning device and the discharge device so that cleaning is improved overall in an energy-efficient manner. The coupling solution, which can be implemented cost-effectively, for example provides that in the coupled position the cleaning device is also driven concurrently by the discharge device and that in the uncoupled position the cleaning device remains in its most recent position and only the discharge device continues to be driven permanently.

Thus, one benefit of the control device with coupling solution is that the discharge device can be driven permanently, whereas the cleaning device is only driven intermittently by the coupling. On the other hand, however, it is also readily possible in reverse sequence to drive the cleaning device permanently and the discharge device only intermittently by means of the coupling, so that both drive concepts can be implemented here depending on the application. Beyond this, it is also possible to provide the coupling device on the filter device, both on the upper side and on the underside of the backflushing device, so that a modular design concept can be implemented. This has no equivalent in prior art.

In some embodiments, it is provided that, as a control part, the coupling device comprises a claw coupling, the claws of which are engaged with recesses in the cleaning device in the coupled position and are disengaged in the uncoupled position. In this way, a positive-fit connection is achieved within the coupling, which enables low impact coupling and uncoupling between the cleaning device and the discharge device.

In this case, the control device for example comprises a further control part, which is a component part of the discharge device and which cooperates with a control path of the coupling device in such a manner that, during a rotary movement of the discharge device, the coupling device comes into the disengaged position by being brought into a raised position by the cleaning device. In this case, the displacement movement of the coupling device into the raised position is for example supported by an energy accumulator so that unobstructed operation is achieved for the coupling.

In some embodiments, it is provided that the partial cleaning units are arranged one above the other in a longitudinal axis of the cleaning unit, which units can be moved with their one free end along the filter segments and which open out with their other free end into the respectively associated passage points of the cleaning device, which is designed at least partially as a hollow tube. In this case, the filter segments can form individual subunits of a filter bowl. For example, however, the filter bowl is formed integrally throughout and the construction according to filter segments only emerges due to the function of the cleaning device with its individual partial cleaning units which in this respect pass over the filter bowl on the inner circumference segment by segment in each case.

In some embodiments, it is provided that a further hollow tube is guided in the hollow tube of the cleaning device as part of the discharge device, the discharge openings of which are distributed over the circumference of the further hollow tube in such a manner that one passage point in each case is brought in succession into alignment with a discharge opening to form a fluid passage, whereas the further possible fluid passages are blocked at least in part, for example all. This segmentation of the filter area undergoing backflushing increases the backflush intensity. The “backflush energy” present is thus focused on a small area of the filter which, on the one hand, results in finer filtration being possible with this system and, on the other hand, this system can manage with a smaller backflush volume which benefits the environment.

In some embodiments, it is provided that the control path of the coupling device is divided into individual path segments for controlling the partial cleaning units, so that in the coupled state at least one fluid passage is always activated and after passing through an uncoupling-coupling cycle at least one other fluid passage is activated and the respective further fluid passages are deactivated.

In this case, it is further for example provided that the control device comprises a further third control part which, configured as a thrust piece, holds the coupling device in its coupled position contrary to the action of the energy accumulator and cooperates with a path segment of the coupling device in such a manner that the thrust piece, rendered inoperable along a curved segment, enables the coupling operation. A resulting angular offset between the discharge device and the cleaning device during a switching or coupling operation corresponds to the predefinable angular pitch of the discharge openings distributed over the tubular discharge device, so that in this respect the segments of the backflushing unit are activated in succession.

For example, it is provided that the length of the curved segment in engagement with the thrust piece is dimensioned in such a manner that, in the coupled state of the coupling device, the fluid passage provided in the cleaning sequence materialises between the cleaning device and the discharge device.

In some embodiments, it is further provided that, during a switching operation between the coupled and uncoupled state of the coupling device, a relative movement occurs between the cleaning device and the discharge device, while the discharge device continues to rotate. The radial discharge opening of the discharge device can be configured longer, viewed in the direction of rotation, than the respectively assignable passage point in the cleaning device. In this way, a predefinable angular overlap is achieved, which ensures that the filter segment respectively undergoing backflushing also continues to be cleaned during the relative movement between the two devices. In this respect, it is also ensured that the backflushed filter segment is cleaned over 360° and thus is cleaned completely.

The invention is explained in greater detail in the following with reference to embodiments according to the drawings. The drawings show in principle and not to scale. Specific references to components, process steps, and other elements are not intended to be limiting. Further, it is understood that like parts bear the same or similar reference numerals when referring to alternate FIGS.

FIG. 1 shows an embodiment of the filter device with a filter housing denoted as a whole by 1, which has a housing main part 2 in the shape of a pot, on the base 3 of which there is a bearing surface 5 coaxial with a central longitudinal axis 4 of the housing. A lateral inlet 7 for the supply of unfiltered medium is provided as access to the housing space 6 adjacent to the base 3, so that the housing space 6 forms the unfiltered medium side. On the upper side, the housing main part 2 is closed by a housing cover 8 removably attached by means of retaining screws, in which, as in the base 3, a bearing surface 9 is formed coaxial with the axis 4. A filtrate outlet 10, which is arranged in a position aligned with the lateral inlet 7 and via which filtrate flows out of the adjacent housing space 11, forming the clean or filtrate side during operation, is provided adjacent to the housing cover 8 in the housing main part 2. A backflushing filter assembly, denoted as a whole by 13 and described in greater detail below, which is located in the vicinity of the unfiltered medium inlet 7, is arranged in the housing main part 2 above a wall ledge 12 which forms a step.

The assembly 13 comprises a filter 14 in the form of a filter basket, which is accommodated on its free end faces in an end cap 15 and 16, respectively. By means of the end caps 15 and 16, the filter 14 is supported in the filter housing 1 and after removing the housing cover 8, the filter 14 can be removed from the housing 1. The filter material of the filter 14 is accommodated between supporting bodies 17 and 18, the fluid passage points of the inner supporting body 18 being formed of slot-shaped window openings of an otherwise continuously formed cylindrical supporting body. The filter medium of the filter 14 consists for example of a pleated filter mat web, consisting of at least one filter layer.

The filter 14 is functionally subdivided into individual filter segments and the assembly 13 comprises a cleaning device 19, which has, associated with each filter segment, a partial cleaning unit 20, 21 and 22, which can be moved along the cleaning device and which cooperates with a rotatable discharge device 23 with individual discharge openings 24, 25 and 26 which, brought into at least partial alignment with fluid-permeable passage points 27, 28 and 29 in the cleaning device 19, serves to discharge a fluid flow from the filter 14. Each partial cleaning unit 20, 21 and 22 forms a kind of slotted nozzle on its free end face, which slotted nozzle is rotatably arranged along the inner circumference of the filter 14 by means of a backflush arm 30 as part of the cleaning device 19, in the form of a hollow tube. In the course of particle filtration, flow passes through the filter 14 from inside to outside and in the process deposits the particle contamination removed from the fluid on its inner side. Due to filtrate pressure in the housing space 11 on the clean or filtrate side, in this way the deposited particle contamination is backflushed from outside to inside into the respective slotted nozzle of a partial cleaning unit 20, 21 and 22 and passes via the hollow backflush arm 30, passing through the lower bearing point 5, to the so-called sludge discharge side 31, which engages in the housing main part 2 from the bottom side opposite the housing space 6. In this respect, the hollow tube of the backflush arm 30 is connected at the bottom to the sludge discharge side 31 in a media-conducting manner.

As can further be seen from FIG. 1, all partial cleaning units 20, 21 and 22 are attached in vertical arrangement one above the other on the backflush arm 30 with their respective slotted nozzles directed towards and abutting the inner side of the supporting body 18 of the filter 14. For improved circulation guidance of these partial cleaning units 20, 21 and 22, a balancing arm 32 is mounted in each case diametrically opposite on opposing sides of the backflush arm 30 towards the top and bottom. An electric motor 33 is used for the rotating drive of the devices 19 and 23, the driven shaft 34 of said drive permanently driving the discharge device 23 via a journal connection 35 by means of a drive shaft 36 connected to said discharge device. For this purpose, the discharge device 23 with its discharge openings 24, 25 and 26 is guided inside the hollow backflush arm 30, which discharge device being rotatably arranged in the hollow backflush arm 30 forms a kind of switching tube 38 in cooperation with a control device denoted as a whole by 40.

Figure 4:
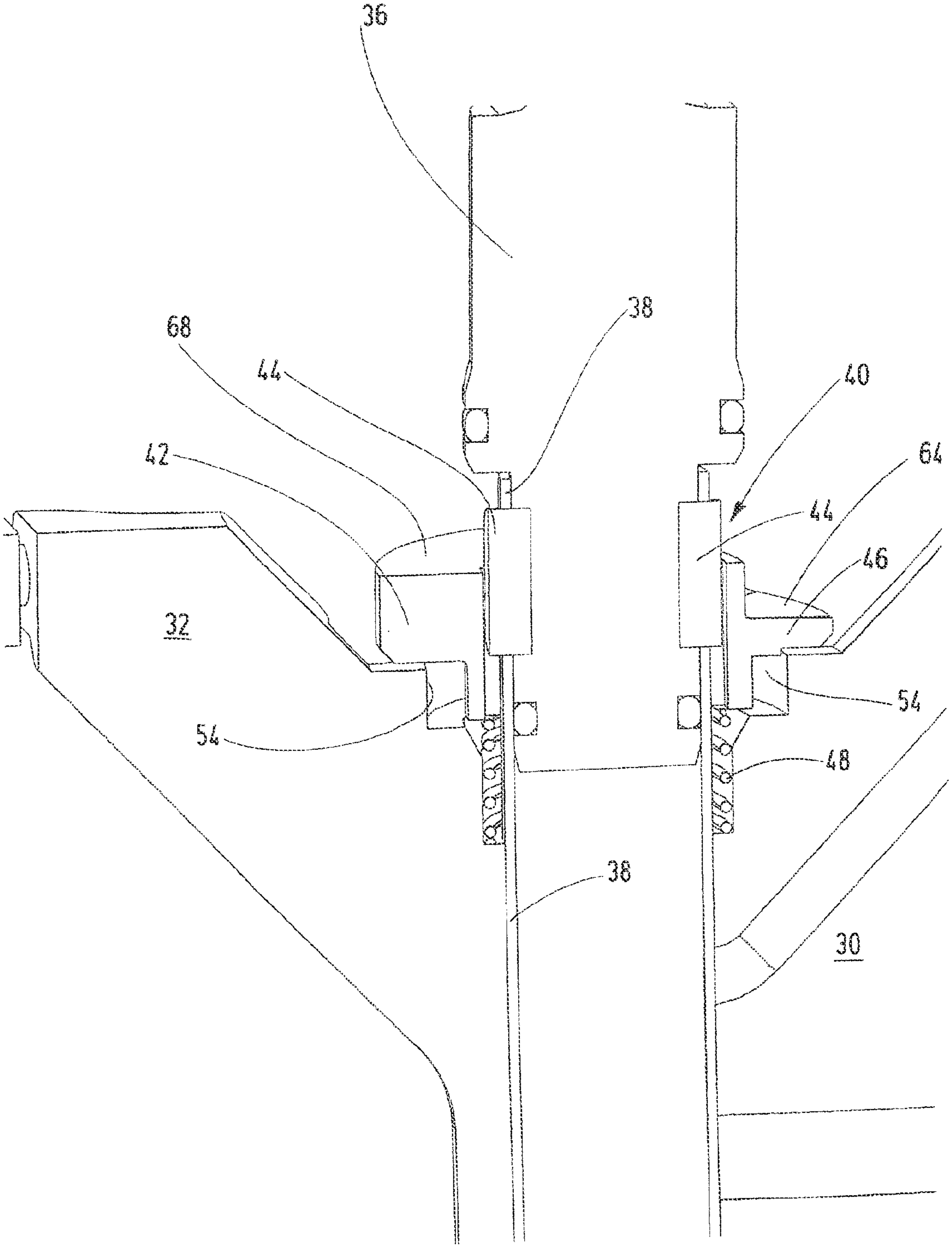
FIGS. 4 to 7 show various example diagrams of a control device with reference to a coupling device used in FIGS. 1 to 3.

As the sectional view according to FIG. 4 shows in particular, the driven shaft 34 is permanently driven by the electric motor 33 and rotates permanently. Accordingly, the drive shaft 36 for the discharge device 23 also rotates permanently. The associated switching tube 38, for example formed from a tubular section of precision steel tubing, is mounted in the backflush arm 30 via a clearance fit so as to be freely rotatable. The switching tube 38 is firmly connected to the drive shaft 36 via two feather key pieces 44 diametrically opposed to the longitudinal axis 4 and thus also co-rotates permanently during operation of the electric motor 33. The two feather key pieces 44 protrude radially, according to the diagram of FIG. 4, laterally through the switching tube 38 and provide axial guidance for a switching bush 46 as part of a coupling device 42, forming a kind of sliding seat which is a substantial part of the control device 40. The annular switching bush 46, which surrounds the switching tube 38 with a central opening, is in this respect centred on the switching tube 38 and held via the two feather key pieces 44 in tangential positive fit with respect to the switching tube 38 and the drive shaft 36, respectively. Due to the aforementioned feather key guidance, the switching bush 46 rotates permanently during operation of the electric motor 33. Viewed in the direction of FIG. 4, a compression spring 48 arranged below the switching bush 46 forms the energy accumulator for the coupling device 42 as a whole and exerts an upwardly directed force on the switching bush 46. In this case, the compression spring 48 is arranged with its one free end in a recess in the backflush arm 30 and rests with its opposing other free end on a shoulder-like extension of the annular switching bush 46. A hydraulic drive motor can also be used instead of an electric motor 33.

Figure 5:
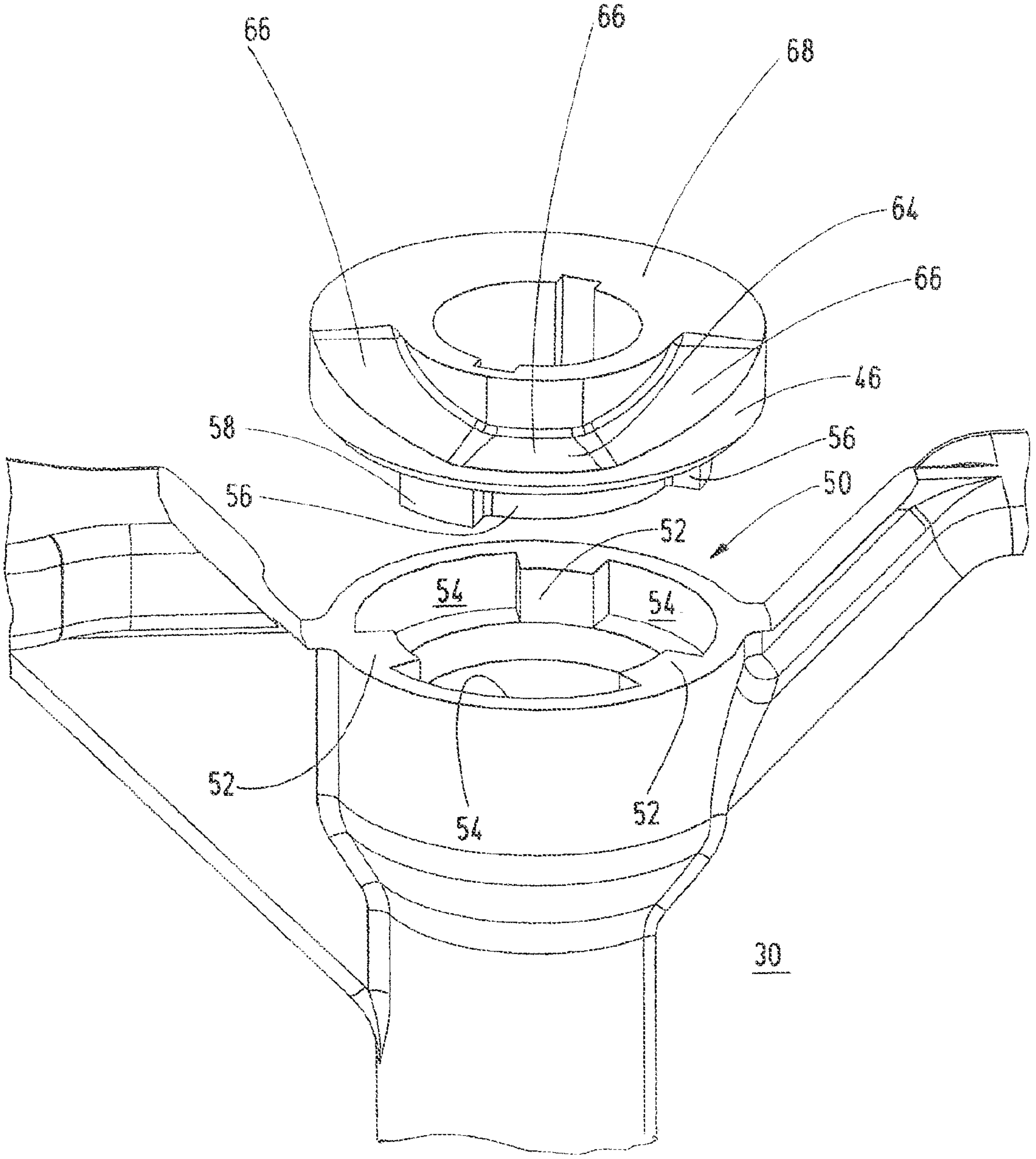

As further emerges from FIG. 5, the contours on the upper side of the backflush arm 30 and on the underside of the switching bush 46, with the axial movability of the switching bush 46 provided along the longitudinal axis 4, form a switchable claw coupling 50 as a whole which is to be regarded as part of the coupling device 42, the feather key pieces 44, which form the sliding seat for the switching bush 46, forming the further control part of the control device 40 and the coupling device 42, respectively. Forming the claw coupling 50, the backflush arm 30 of the cleaning device 19 has on its upper side a pot-shaped hollow with individual webs 52 which, viewed in the radial direction, define between them recesses 54, which serve to accommodate claw-like protrusions 56, which protrude on the underside of the switching bush 56, and which have between them inwardly indented radial segments 58 in which the webs 52 engage in the coupled position of the claw coupling 50.

Figure 6:
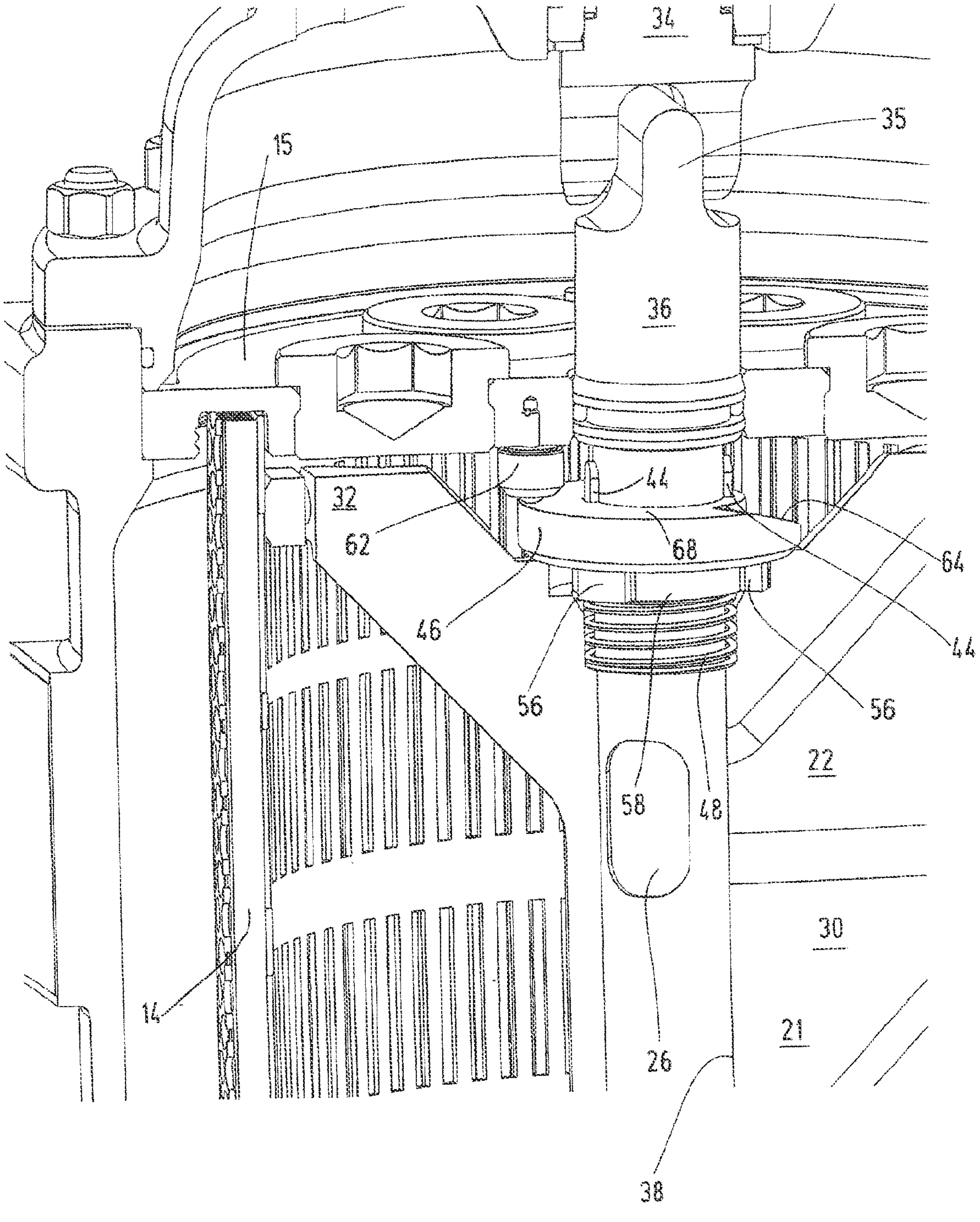
Figure 7:
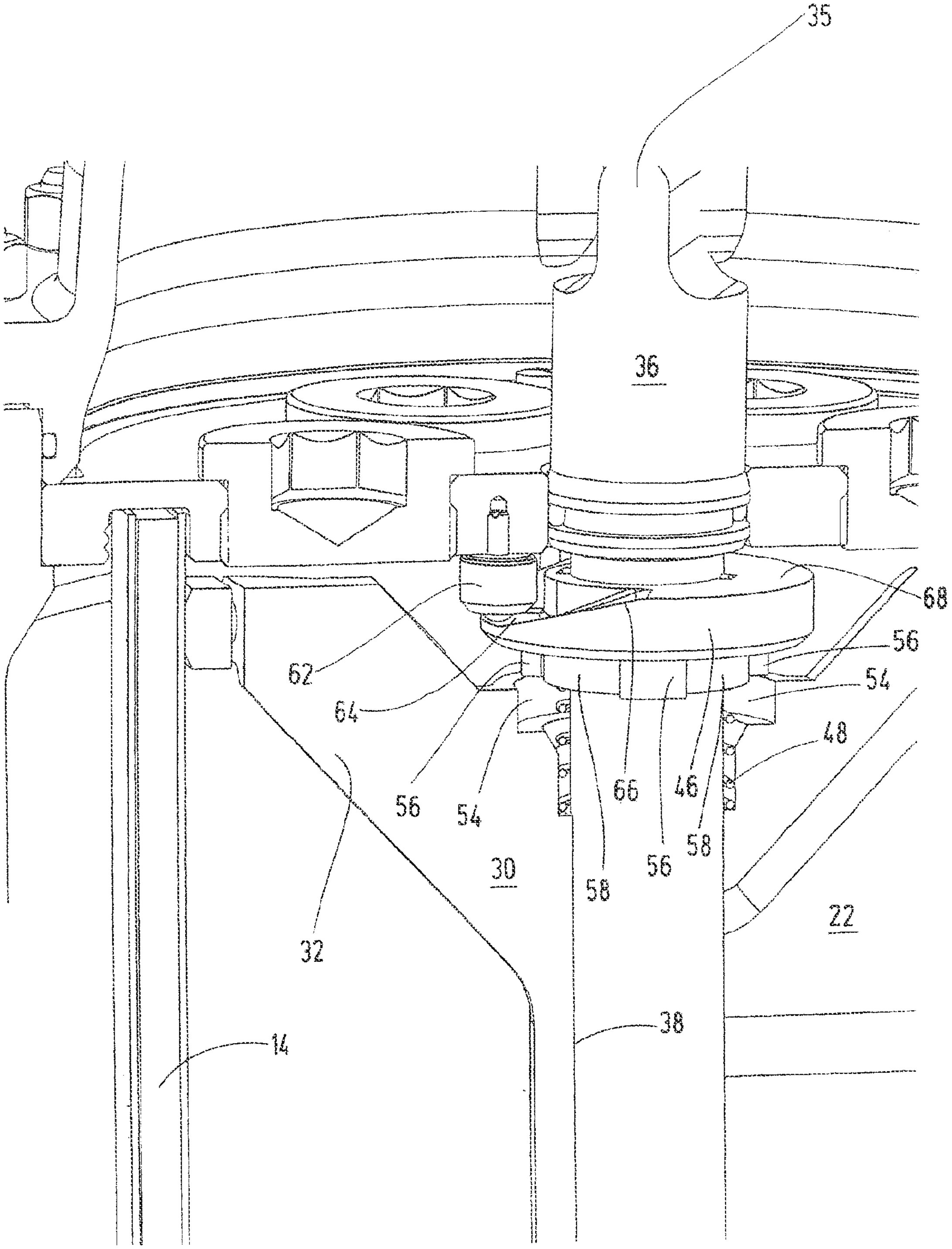

If the switching bush 46 is in positive engagement with the backflush arm 30 according to the diagram of FIG. 6, the coupling device 42 or the claw coupling 50, respectively, is engaged or connected, respectively, and the backflush arm 30 is driven via the switching bush 46. If, on the other hand, the switching bush 46 is displaced axially upwards under the action of the compression spring 48 and is not in positive engagement with the backflush arm 30, then according to the diagram of FIG. 7, the coupling device 42 is disengaged or not connected and the switching bush 46 continues to rotate with the switching tube 38 while the backflush arm 30 remains stationary. As shown in the diagram of FIG. 1, to prevent the backflush arm from being undesirably carried along due to friction locking inside the fit, an O-ring 60 is provided on the underside of the backflush arm 30 in the region above the lower bearing point 5, which in this respect causes a constant braking torque on the backflush arm 30. As further emerges from FIGS. 6 and 7, within the control device 40 there is a further third control part in the form of a thrust piece 62 which can exert a force on the switching bush 46 from above contrary to the action of the compression spring 48. Thus FIGS. 6 and 7 show in particular the interaction of the thrust piece 62 in the form of a ball roller with the compression spring 48 and the switching bush 46, with FIG. 6 illustrating the engaged coupling state and FIG. 7 the disengaged state. According to the diagram of FIG. 6, the switching bush 46 is pushed upwards by the compression spring 48, the upper side of the switching bush 46 bearing against the ball roller of the thrust piece 42 which, designed as a screw-in part, is firmly connected to the upper end cap 15. In the state shown in this respect in FIG. 6, the claw coupling 50 is engaged, so that the switching bush 46 and the backflush arm 30 rotate jointly together, the switching bush 46 carrying the switching tube 38 along in the rotary movement via the feather key pieces 44, as already explained.

As additionally emerges in particular from FIG. 5, the contour on the upper side of the switching bush 46 has a hollow 64 which is divided into individual curved segments 66, the middle curved segment 66 forming the lowest point of the hollow 64 and the two other curved segments 66 forming approach ramps for the axially immovable thrust piece 62, which ramps, starting from the central curved segment 66, open outwards into a further curved segment 68 which forms a horizontal surface transverse to the longitudinal axis 4 and in this respect forms the highest approach point for the thrust piece 62 within the switching bush 46. In this respect, therefore, the hollow 64 passes over the said inclined surfaces 66 into the cylindrical region 68 of the switching bush 46. In the angular region of the hollow 64 with the deepest curved segment 66, the switching bush 46 is moved axially upwards by the compression spring 48 and the claw coupling 50 is then disengaged according to the diagram of FIG. 7. As a result, the backflush arm 30 is stationary; the switching tube 38, however, continues to rotate and a relative angular offset is created between the backflush arm 30 and the switching tube 38. If, as shown in the diagram of FIG. 6, the switching bush 46 is moved downwards again by the thrust piece 62, the claw coupling 50 connects again and the desired positive engagement occurs, as described above. The angular offset between the switching tube 38 and the backflush arm 30 in the course of a switching operation corresponds to the angular pitch of the individual radially offset discharge openings 24, 25 and 26 in the switching tube 38, as an inner component of the cleaning device 23, with the associated passage points 27, 28 and 29. Thus, the individual segments of the backflushing unit 10 can be activated in succession, which is explained in greater detail below.

While in prior art (DE 10 2017 001 968 A1) all partial cleaning units arranged one above the other are used simultaneously and together for backflushing, the solution according to the teachings herein provides for the use of only one partial cleaning unit at a time, and in the context of improved backflushing the other two partial cleaning units are excluded from backflushing. It is understood that not only three partial cleaning units 20, 21 and 22 can be used according to the embodiment presented here, but that the present solution also works with only two partial cleaning units or with a larger number of more than three partial cleaning units, which is particularly suitable if the filter basket has a larger axial installation length than the solution shown according to FIGS. 1 to 3.

Thus, the segmented structural solution of the backflushing filter assembly 13 according to FIG. 1 shows backflushing via the lower actively held segment. In this respect, therefore, the backflushing unit 13 is divided into individual segments in the axial direction, with flow only ever passing through one segment at a time per revolution of the backflushing unit 13; according to the diagram of FIG. 1, the lower segment, with the lower discharge opening 24 of the discharge device 23 being in alignment with the lower passage point 27 of the cleaning device 19, thereby forming a fluid passage. The other discharge openings and passage points of switching tube 38 and backflush arm 30 are each radially offset from one another by 120 degrees and accordingly cannot be used for backflushing because the pipe wall of the cleaning device 19 overlaps the discharge openings 25, 26 of the discharge device 23.

Figure 2:
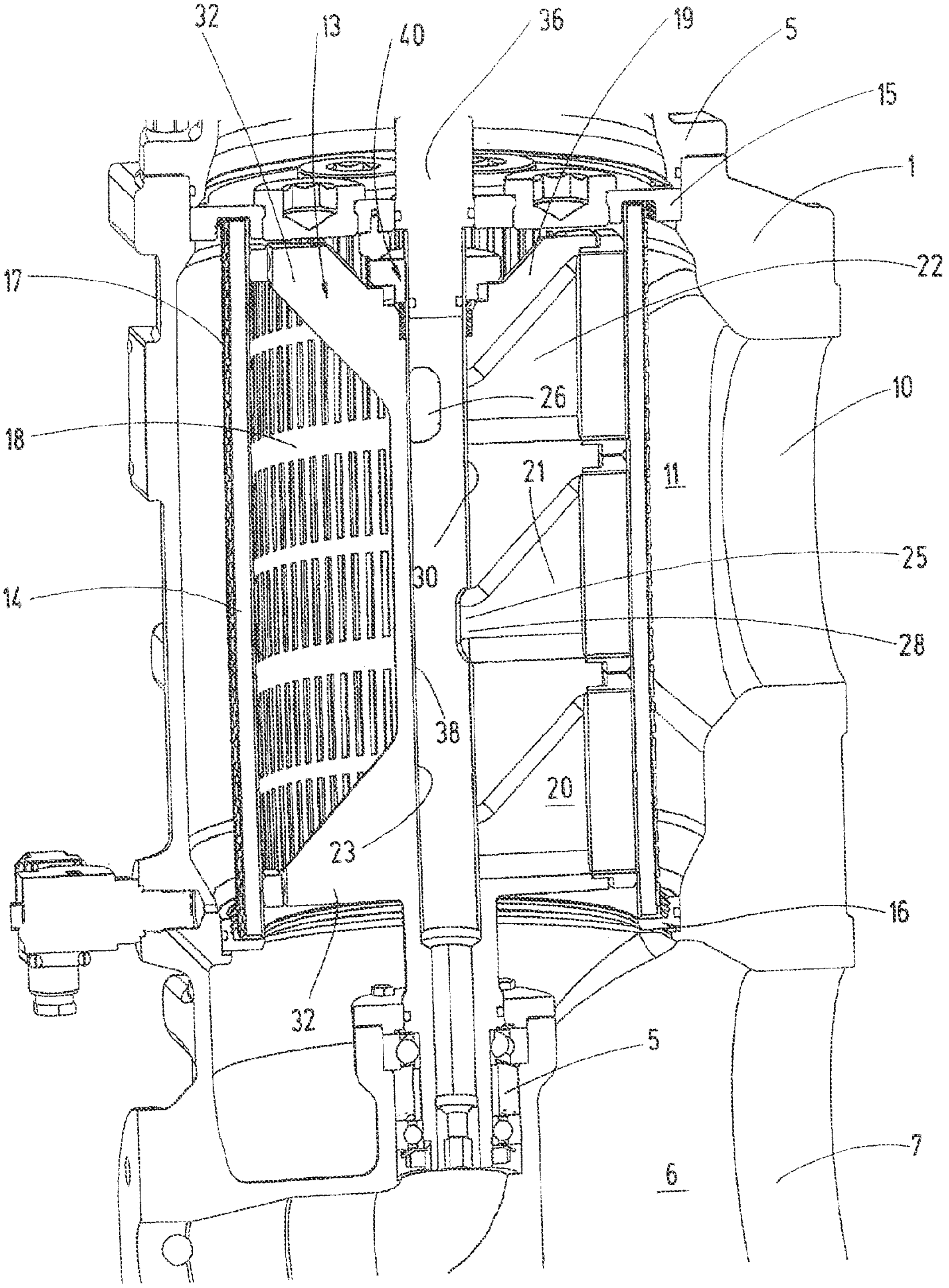

As mentioned, by segmenting the area of the filter 14 that is being backflushed in each case, the backflush intensity is increased and the backflush energy present is focused on a smaller area of the filter. On the one hand, this means that finer filtration is possible with this system and, on the other hand, this system can work with a smaller backflush volume. The segmentation referred to for the filter 14 is implemented, on the one hand, in that due to its various passage points 27, 28 and 29, the backflush arm 30 has a plurality of flow channels separated from one another and, on the other hand, it is further provided that the switching tube 38 is located inside the backflush arm 30, which tube has discharge openings 24, 25 and 26 radially offset around the circumference, the flow channels of the backflush arm 30 referred to being activated in succession by a specific relative angular offset of the switching tube 38 with respect to the backflush arm 30 of 120 degrees. Thus, FIG. 2 shows a state in which the middle segment of the filter 14 is activated for backflushing, with the result that the middle, internal discharge opening 25 is in fluid-permeable alignment with the external passage point 28. The other discharge openings and passage points are then separated from each other again for fluid passage through the wall parts of backflush arm 30 and switching tube 38.

Figure 3:
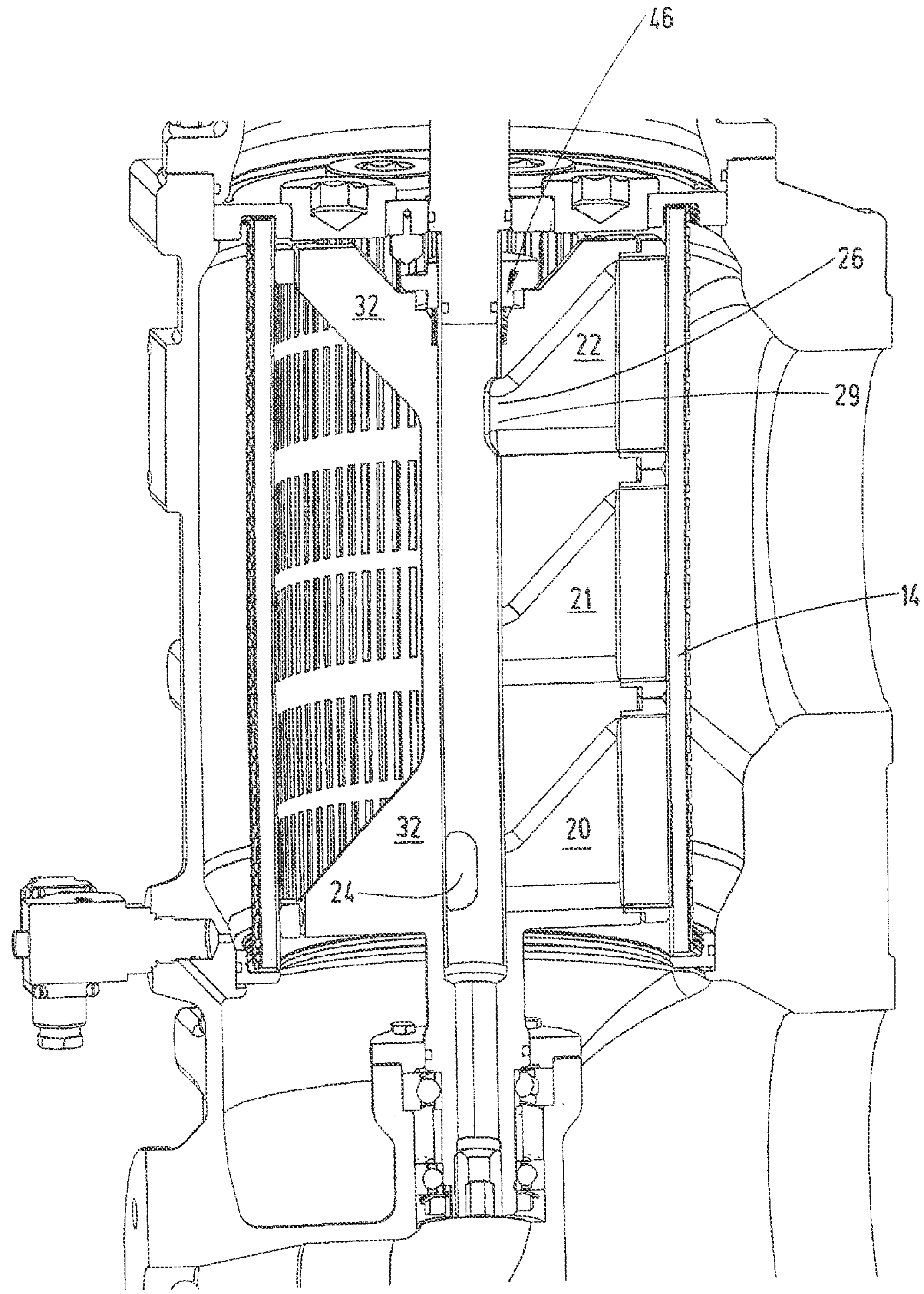

FIG. 3 now shows in turn the activation of the upper segment of the filter 14, in which the upper discharge opening 26 of the discharge device 23 is in a fluid-permeable position with the upper passage point 29 of the cleaning device 19. To be able to create this specific relative angular offset of the switching tube 38 with respect to the backflush arm 30 of 120 degrees in each case, i.e. to activate the individual segments of the filter 14 in succession, requires the mechanical switching process within the backflushing unit 13 by means of the control device 40 while using the claw coupling 50, whereby the curved segments 66 of the hollow 64 with the horizontally extending curved segment 68 are dimensioned in terms of the path length in such a manner that, in cooperation with the thrust piece 62, the switching cycles of 120 degrees angular offset each are achieved for discharge openings 24, 25 and 26 with respect to passage points 27, 28 and 29.

In the embodiment described above, the upper counter bearing to the switching bush 46 is a ball roller which is arranged in the filter basket 14. However, the counter bearing can also be formed by other components, for example by a cam, a pin or the like. Likewise, the counter bearing can also be arranged on other fixed components in the filter, for example directly on the filter housing 1 instead of on the upper end cap 15. The concept of the switching mechanism can also be implemented by other forms of switchable couplings, for example using a friction coupling, a solenoid-operated coupling, etc. With only two partial cleaning units, the angular offset is 180 degrees, with four partial cleaning units 90 degrees and so on.

The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments. The term "in particular" and "particularly" used throughout the specification means "for example" or "for instance".

The mere fact that certain measures are recited in mutually different dependent claims or embodiments does not indicate that a combination of these measures cannot be used to advantage. Any reference signs in the claims should not be construed as limiting the scope.

What is claimed is:

1. A filter device, comprising at least:

a filter, which is divided into individual segments;

a cleaning device, which has, associated with each filter segment, a partial cleaning unit, which can be moved along the cleaning device and which cooperates with a rotatable discharge device with individual discharge openings which, brought into at least partial alignment with passage points in the cleaning device, serves to discharge a fluid flow from the filter; and a control device, which activates at least one partial cleaning unit for cleaning, whereas at least one further partial cleaning unit remains inactive during this cleaning; wherein the control device has a coupling device, which, in one position of the coupling device, connects the cleaning device to the discharge device for a common rotary movement and, in another position of the coupling device, disconnects the cleaning device and the discharge device from each other.

2. The filter device of claim 1, wherein, as a control part, the coupling device comprises a claw coupling, the claws of which are engaged with recesses in the cleaning device in the connected position and are disengaged in the disconnected position.

3. The filter device of claim 2, wherein the control device comprises a further control part, which is a component part of the discharge device and which cooperates with a control path of the coupling device in such a manner that, during a rotary movement of the discharge device, the coupling device comes into the disengaged position by being brought into a raised position by the cleaning device.

4. The filter device of claim 2, wherein the partial cleaning units are arranged one above the other in a longitudinal axis of the cleaning device, which cleaning units can be moved with their one free end along the filter segments and which open out with their other free end into the respectively associated passage points of the cleaning device, which is designed at least partially as a hollow tube.

5. The filter device of claim 2, wherein a further hollow tube is guided in a hollow tube of the cleaning device, as part of the discharge device, the discharge openings of which are distributed over the circumference of the further hollow tube in such a manner that one passage point in each case is brought in succession into alignment with a discharge opening to form a fluid passage, whereas further possible fluid passages are blocked at least in part.

6. The filter device of claim 2, wherein a control path of the coupling device is divided into individual path segments for controlling the partial cleaning units, so that in the connected position at least one fluid passage is always activated and after passing through an uncoupling-coupling cycle at least one other fluid passage is activated and the respective further fluid passages are deactivated.

7. The filter device of claim 1, wherein the control device comprises a further control part, which is a component part of the discharge device and which cooperates with a control path of the coupling device in such a manner that, during a rotary movement of the discharge device, the coupling device comes into the disconnected position by being brought into a raised position by the cleaning device.

8. The filter device of claim 7, wherein a displacement movement of the coupling device into the raised position is supported by an energy accumulator.

9. The filter device of claim 8, wherein the partial cleaning units are arranged one above the other in a longitudinal axis of the cleaning device, which cleaning units can be moved with their one free end along the filter segments and which open out with their other free end into the respectively associated passage points of the cleaning device, which is designed at least partially as a hollow tube.

10. The filter device of claim 8, wherein a further hollow tube is guided in a hollow tube of the cleaning device, as part of the discharge device, the discharge openings of which are distributed over the circumference of the further hollow tube in such a manner that one passage point in each case is brought in succession into alignment with a discharge opening to form a fluid passage, whereas further possible fluid passages are blocked at least in part.

11. The filter device of claim 7, wherein the partial cleaning units are arranged one above the other in a longitudinal axis of the cleaning device, which cleaning units can be moved with their one free end along the filter segments and which open out with their other free end into the respectively associated passage points of the cleaning device, which is designed at least partially as a hollow tube.

12. The filter device of claim 7, wherein a further hollow tube is guided in a hollow tube of the cleaning device, as part of the discharge device, the discharge openings of which are distributed over the circumference of the further hollow tube in such a manner that one passage point in each case is brought in succession into alignment with a discharge opening to form a fluid passage, whereas further possible fluid passages are blocked at least in part.

13. The filter device of claim 7, wherein the control path of the coupling device is divided into individual path segments for controlling the partial cleaning units, so that in the coupled state at least one fluid passage is always activated and after passing through an uncoupling-coupling cycle at least one other fluid passage is activated and respective further fluid passages are deactivated.

14. The filter device of claim 1, wherein the partial cleaning units are arranged one above the other in a longitudinal axis of the cleaning device, which cleaning units can be moved with their one free end along the filter segments and which open out with their other free end into the respectively associated passage points of the cleaning device, which is designed at least partially as a hollow tube.

15. The filter device of claim 14, wherein a further hollow tube is guided in a hollow tube of the cleaning device, as part of the discharge device, the discharge openings of which are distributed over the circumference of the further hollow tube in such a manner that one passage point in each case is brought in succession into alignment with a discharge opening to form a fluid passage, whereas further possible fluid passages are blocked at least in part.

16. The filter device of claim 1, wherein a further hollow tube is guided in a hollow tube of the cleaning device, as part of the discharge device, the discharge openings of which are distributed over the circumference of the further hollow tube in such a manner that one passage point in each case is brought in succession into alignment with a discharge opening to form a fluid passage, whereas further possible fluid passages are blocked at least in part.

17. The filter device of claim 1, wherein a control path of the coupling device is divided into individual path segments for controlling the partial cleaning units, so that in the connected position at least one fluid passage is always activated and after passing through an uncoupling-coupling cycle at least one other fluid passage is activated and the respective further fluid passages are deactivated.

18. The filter device of claim 1, wherein the control device comprises a further third control part which, configured as a thrust piece, holds the coupling device in its connected position contrary to the action of an energy accumulator and cooperates with at least one path segment of the coupling device in such a manner that the thrust piece, rendered inoperable along a curved segment, enables the coupling operation.

19. The filter device of claim 1, wherein the length of a curved segment in engagement with a thrust piece is dimensioned in such a manner that, in the connected position of the coupling device, the fluid passage provided in a cleaning sequence materializes between the cleaning device and the discharge device.

20. The filter device of claim 1, wherein, during a switching operation between the connected and disconnected position of the coupling device, a relative movement occurs between the cleaning device and the discharge device.

* * * * *